Oct. 9, 1956

R. H. KITTLEMAN ET AL 2,766,094

GYROSCOPE COURSE RECORDER

Filed Dec. 1, 1953

INVENTORS
ROBERT H. KITTLEMAN
RONALD G. WARREN

BY

*J. D. O'Brien*
*E. C. Walsh*

ATTORNEYS

United States Patent Office 2,766,094
Patented Oct. 9, 1956

2,766,094

GYROSCOPE COURSE RECORDER

Robert H. Kittleman and Ronald G. Warren, Sharon, Pa., assignors, by mesne assignments, to the United States of America as represented by the Secretary of the Navy Application December 1, 1953, Serial No. 395,634

7 Claims. (Cl. 346—8)

This invention relates to improvements in course recording devices and in particular to a course recording device which is capable of continuously and accurately measuring the course of a vehicle on which it is mounted even though the vehicle may circle one or more times.

This invention is particularly well adapted for recording the course in azimuth of acoustic homing torpedoes which may circle one or more times during the search, attack, and reattack phases of their operation. A complete and accurate record of the course of an acoustic homing torpedo is necessary in order to test and evaluate the operation of the torpedo's guidance and control means.

In a previously used course recording device, the rotor of a pick-off device such as a synchro generator is mounted on the outer gimbal of a two degrees of freedom course gyroscope in the vehicle whose course is to be determined. Two of the leads from the stator of the synchro are directly connected to a recording device such as an oscillograph. The amplitude of the voltage applied to the oscillograph varies as a function of the sine of the angle between the rotor and the stator of the synchro generator, which angle has a fixed relation to the course of the vehicle. Such a system has no accumulative errors, and good resolution except in the vicinity of 90° and 270° where the rate of change of the amplitude of the voltage with respect to changes of course is zero. In this region it becomes impossible to measure the course with the desired degree of accuracy.

It is, therefore, an object of this invention to provide a course recording device for a vehicle which continuously and accurately measures the course of the vehicle.

It is a further object of this invention to provide a course recording device for a torpedo which continuously and accurately measures the course of the torpedo even if the torpedo circles one or more times.

Other objects and many of the attendant advantages of this invention will be readily appreciated as the same become better understood by reference to the following detailed description when considered in connection with the accompanying drawings wherein.

Figure 2:
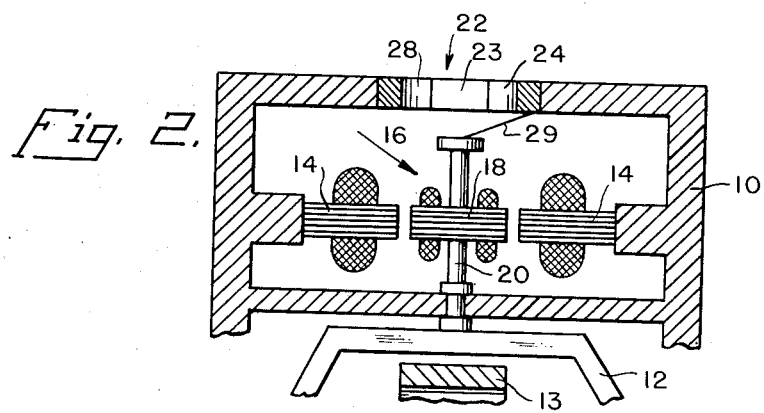
Fig. 2 is a broken away sectional view of a portion of a course gyro, a synchro generator, a commutator and a movable contact, which constitute elements of the invention.

In Fig. 2, housing 10 is adapted to be fixedly mounted in a vehicle, such as a torpedo, which is not illustrated, whose course is to be continuously recorded. A conventional two degrees of freedom course gyroscope, having an outer gimbal 12, pivotally mounted in housing 10, and an inner gimbal 13 which is pivotally secured in the conventional manner to the outer gimbal 12. The stator 14 of a synchro generator 16 is fixedly mounted within housing 10. The rotor 18 of synchro generator 16 is fixedly mounted on shaft 20 which is fixedly secured to outer gimbal 12.

Commutator 22 is mounted in housing 10 and consists of six equal conducting segments 23, 24, 25, 26, 27, 28. Each of these segments extends through substantially 60 degrees of arc with respect to the center of commutator 22 and is separated by suitable insulating means from the adjacent segments. Movable contact 29 is fixedly mounted on shaft 20 and is adapted to engage the segments of commutator 22.

Figure 1:
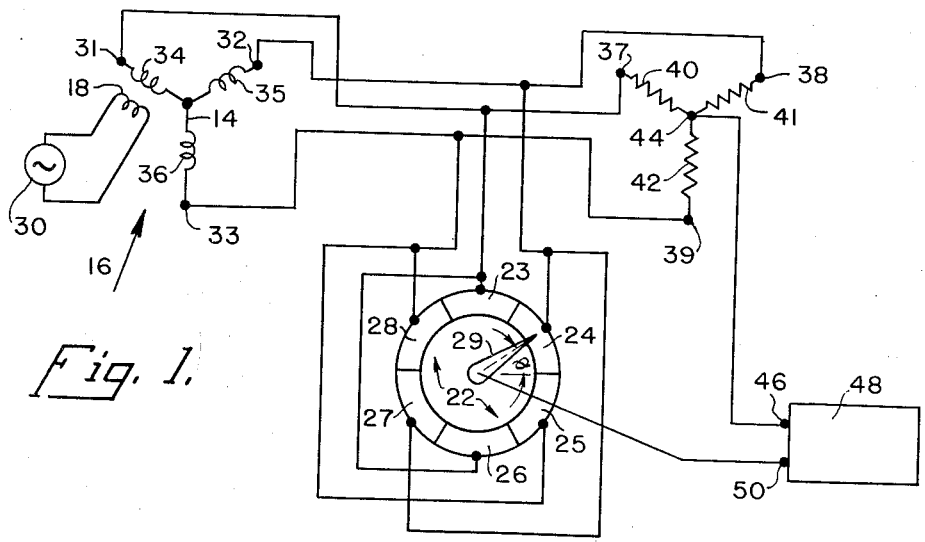
Fig. 1 is a schematic diagram of the electrical components of the invention.

Referring to Fig. 1, rotor 18 of synchro generator 16 is energized by a source of alternating current 30 which provides 115 volts 400 cycle power, for example. The output terminals 31, 32, 33 of stator windings 34, 35, 36 of stator 14 of the synchro generator are respectively connected to terminals 37, 38, 39 of star connected resistors 40, 41, 42 which have substantially equal values of resistance. Segments 25, 28 of commutator 22 are connected to terminals 33, 39; segments 23, 26 are connected to terminals 31, 37; and segments 24, 27 are connected to terminals 32, 38. Common terminal 44 of resistors 40, 41, 42 is connected to terminal 46 of a conventional oscillograph 48. Terminal 50 of oscillograph 48 is electrically connected to movable contact 29.

When the course of a vehicle, such as a torpedo, is to be recorded, the course gyroscope is caged and energized prior to the torpedo being launched. The gyroscope is then uncaged at such time as it is desirable to begin recording the course of the torpedo, by conventional means which are not illustrated. Changes of course of the torpedo in which the recording device is mounted are manifested by relative angular displacement between rotor 18 and stator 14 of synchro generator 16, and by synchronized displacement between commutator 22 and movable contact 29. The amplitudes of the voltages induced in the stator windings 34, 35, 36 are sinusoidal functions of the angle of the rotor 18 with respect to stator 14, zero values of these voltages occurring in sequence at 60° intervals and repeating every 180°, as referenced or plotted against the rotor position angle.

The electrical circuits interconnecting the stator windings 34, 35, 36, commutator 22, contact 29, oscillograph 48 and resistors 40, 41, 42 are so arranged that the voltage drop across only one of the resistors 40, 41, 42 at any given time, or for any given course is applied to oscillograph 48. The arrangement of the components is also chosen so that the voltage being applied to oscillograph 48 is that voltage whose rate of change of amplitude with respect to changes in course is greater than a predetermined minimum value over course increments of 60°.

For example, in Fig. 1, contact 29 engages segment 24 of commutator 22. The amplitude of voltage V applied to oscillograph 48 is then equal to the voltage drop across resistor 41 and is defined by Eq. (1) $\quad V = V_0 \sin(\theta - n\,60°)$ where $V_0$ is the maximum voltage drop across resistor 41. The maximum voltage drop across each of the resistors 40, 41, 42 equals $V_0$ since the maximum voltages induced in stator windings 34, 35 and 36 are equal and the resistance of resistors 40, 41 and 42 are equal. Angle $\theta$ is defined as the angle between contact 29 and the line forming the boundary between segments 24 and 25; $\theta$ increases in the anti-clockwise direction; and $\theta$ has a fixed relation to the course of the torpedo. The factor $n$ is an integer whose value changes each time contact 29 engages a different segment of commutator 24. When contact 29 engages segment 24, $n$ has a value of zero; when it engages segment 23, $n$ has a value of 1; when it engages segment 28, $n$ has a value of 2, etc.

The rate of change of the voltage V applied to oscillograph 43 with change in θ, in the device in which the invention is secured, is Eq. (2) $\qquad \frac{dV}{d\theta} = V_0 \cos(\theta - n60°)$ the minimum value of which is Eq. (3) $\qquad \frac{dV}{d\theta} = \frac{V_0}{2}$ per radian $= \frac{\pi V_0}{360}$ per degree the value which occurs when $(\theta - n60°) = 60°$.

Figure 3:
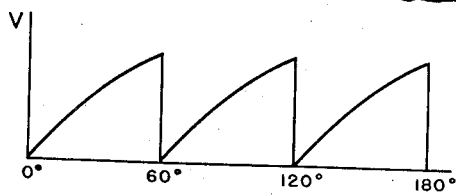
Fig. 3 is a plot of the rectified value of the voltage applied to a recording device plotted against course in degrees.
Figure 4:
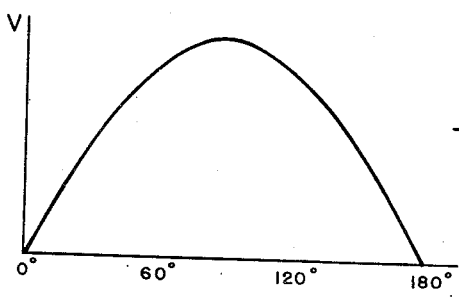
Fig. 4 is a plot of the rectified value of the voltage applied to a recording device against course in degrees of a prior art course recording device.

Fig. 3 illustrates the variation in amplitude of the voltages recorded over a course of from zero to 180° with the apparatus of this invention. Fig. 4 illustrates the variation in amplitude of the voltage recorded over a course of from zero to 180° with prior type course recording devices. A comparison of Figs. 3 and 4 shows that the rate of change of voltage with respect to course is zero at 90° with prior type recording device with resulting poor resolution when the course is in the vicinity of 90°. In the improved course recording device constituting this invention, the rate of change of voltage with respect to course never becomes zero and is in fact never lower than the value defined in Eq. 3 with the result that the course of the vehicle in which the course recording device is located can always be accurately determined.

Obviously many modifications and variations of the present invention are possible in the light of the above teachings. It is, therefore, to be understood that within the scope of the appended claims the invention may be practiced otherwise than as specifically described.

What is claimed is:

1. A course recording device for a vehicle comprising in combination a gyroscope adapted to be mounted in the vehicle and having inner and outer gimbals, a synchro generator having a stator and a rotor, the stator of the synchro generator fixedly mounted on the vehicle and having three windings, the rotor of the synchro generator mounted on the outer gimbal of said gyroscope, a commutator mounted on said vehicle and having six equiangular segments, a movable contact mounted on the outer gimbal and contacting the segments of the commutator, an oscillograph, and circuit means interconnecting the stator windings of the synchro generator, the commutator, the movable contact, and the oscillograph, said circuit means, commutator, and contact being so constructed and arranged to apply to the oscillograph the voltage induced in but a single stator winding and to apply that voltage whose rate of change of amplitude with respect to changes in course exceeds a predetermined minimum value.

2. A course recording device for a movable vehicle comprising a gyroscope adapted to be mounted in said vehicle, said gyroscope having inner and outer gimbals, a synchro generator having a three phase stator, and a rotor, said stator fixedly mounted on said vehicle, and said rotor fixedly mounted on said outer gimbal and turned by the outer gimbal when said vehicle changes courses, said rotor adapted to be energized by a source of alternating current to induce voltages in said stator, a commutator having six segments, each extending over substantially 60° of arc, said commutator fixedly mounted on said vehicle, a movable contact fixedly mounted on said outer gimbal and engaging said commutator, an oscillograph, and circuit means interconnecting the synchro generator, commutator, movable contact and oscillograph, said circuit means, commutator and contact being so constructed and arranged to apply the voltage of but a single phase of said synchro generator to said oscillograph and to apply the voltage whose rate of change of amplitude with respect to changes of course exceeds a predetermined minimum of value.

3. A course recording device for a torpedo comprising a gyroscope adapted to be mounted in said torpedo and having inner and outer gimbals, a synchro generator having a stator and a rotor, the stator having three windings and being fixedly mounted on said vehicle; the rotor being fixedly mounted on said outer gimbal and adapted to be energized by a source of alternating current; a commutator having six segments, each extending over substantially 60° of arc, and being fixedly mounted on said vehicle; a movable contact fixedly mounted on said outer gimbal; an oscillograph; and circuit means interconnecting said stator windings, the segments of the commutator, the movable contact, and the oscillograph, the circuit means, commutator and contact being so arranged and constructed that the voltage induced in a singe winding of the stator is applied to the oscillograph, the voltage applied being the voltage where rate of change of amplitude with respect to changes of course exceeds a predetermined value.

4. A course recording device for a vehicle, comprising: a course gyroscope having a gimbal shaft subject to rotational position changes corresponding to course changes; pick-off means coupled to said shaft and providing at least three signals having amplitudes which are variable between zero and maximum values as functions of shaft position and which, as plotted against said shaft position, exhibit like amplitude waveforms which are sequentially displaced as to zero amplitude positions; signal recording means; and switch means connecting said pick-off means to said signal recording means and coupled to said shaft for operation thereby to selectively apply said signals to said signal recording means in a sequence corresponding to that of said zero amplitude positions as a function of said shaft position.

5. A course recording device for a vehicle, comprising: a course gyroscope having a gimbal shaft subject to rotational position changes corresponding to course changes; pick-off means coupled to said shaft and providing three signals having amplitudes which are variable between zero and maximum values as functions of shaft position and which, as plotted against said shaft position in degrees, exhibit like amplitude waveforms which are sequentially displaced by 60 degrees as to zero amplitude positions; signal recording means; and switch means connecting said pick-off means to said signal recording means and coupled to said shaft for operation thereby to selectively apply said signals to said signal recording means in a sequence corresponding to that of said zero amplitude positions as a function of said shaft position.

6. A course recording device as defined in claim 5, wherein said signals as provided by said pick-off means are sinusoidal functions of shaft position, each said signal as applied to said signal recording means exhibiting amplitude changes which, per unit change in shaft position, vary between a maximum amplitude change and one-half said maximum amplitude change.

7. A course recording device for a vehicle, comprising: a course gyroscope having a gimbal shaft subject to rotational position changes corresponding to course changes; synchro generator pick-off means coupled to said shaft and providing three signals having amplitudes which are variable between zero and maximum values as sinusoidal functions of shaft position and which, as plotted against said shaft position, exhibit like amplitude waveforms which are sequentially displaced as to zero amplitude positions; signal recording means; and commutator switch means connecting said pick-off means to said signal recording means and coupled to said shaft for operation thereby to selectively apply said signals to said signal recording means in a sequence corresponding to that of said zero amplitude positions as a function of said shaft position.

References Cited in the file of this patent
UNITED STATES PATENTS
2,475,314  Dehmel _____ July 5, 1949